United States Patent [19]

Olsen

[11] 4,153,819

[45] May 8, 1979

[54] TELEPHONE TONE SIGNALLING RECEIVER WITH UP-CONVERSION OF FREQUENCY OF TONES CONTROLLED BY WORD INSTRUCTIONS

[75] Inventor: Rolf E. Olsen, Ottawa, Canada

[73] Assignee: Northern Telecom Limited, Montreal, Canada

[21] Appl. No.: 862,110

[22] Filed: Dec. 19, 1977

[51] Int. Cl.² ............................................. H04M 7/12
[52] U.S. Cl. .................................................. 179/84 VF
[58] Field of Search .................. 179/84 VF; 328/138; 340/147 F, 171 PF, 171 R; 324/77 E, 78 F

[56] References Cited

U.S. PATENT DOCUMENTS

| 2,339,633 | 1/1944 | Gilman | 328/138 |
| 2,449,391 | 9/1948 | Kogane | 340/171 R |
| 3,243,703 | 3/1966 | Wood | 324/77 E |
| 3,576,403 | 4/1971 | Sellari, Jr. | 179/84 VF |
| 3,810,019 | 5/1974 | Miller | 340/171 PF |

Primary Examiner—George G. Stellar
Attorney, Agent, or Firm—Frank Turpin

[57] ABSTRACT

A tone receiver, for receiving audio frequency tone signals typically used in telephone signalling, includes a reference frequency generator and a modulator for up-converting audio frequencies. Telephone network tone signalling is up-converted and coupled to a filter including a piezoelectric element. Alternating current signals passing through the filter indicate the presence of a tone signal of a predetermined frequency. Multiple frequency tone signals are detectable using a plurality of modulators and filters, each modulator being supplied with one of a plurality of reference frequencies. In one example, balanced modulation is used with reference frequencies being supplied in the form of square waves.

6 Claims, 4 Drawing Figures

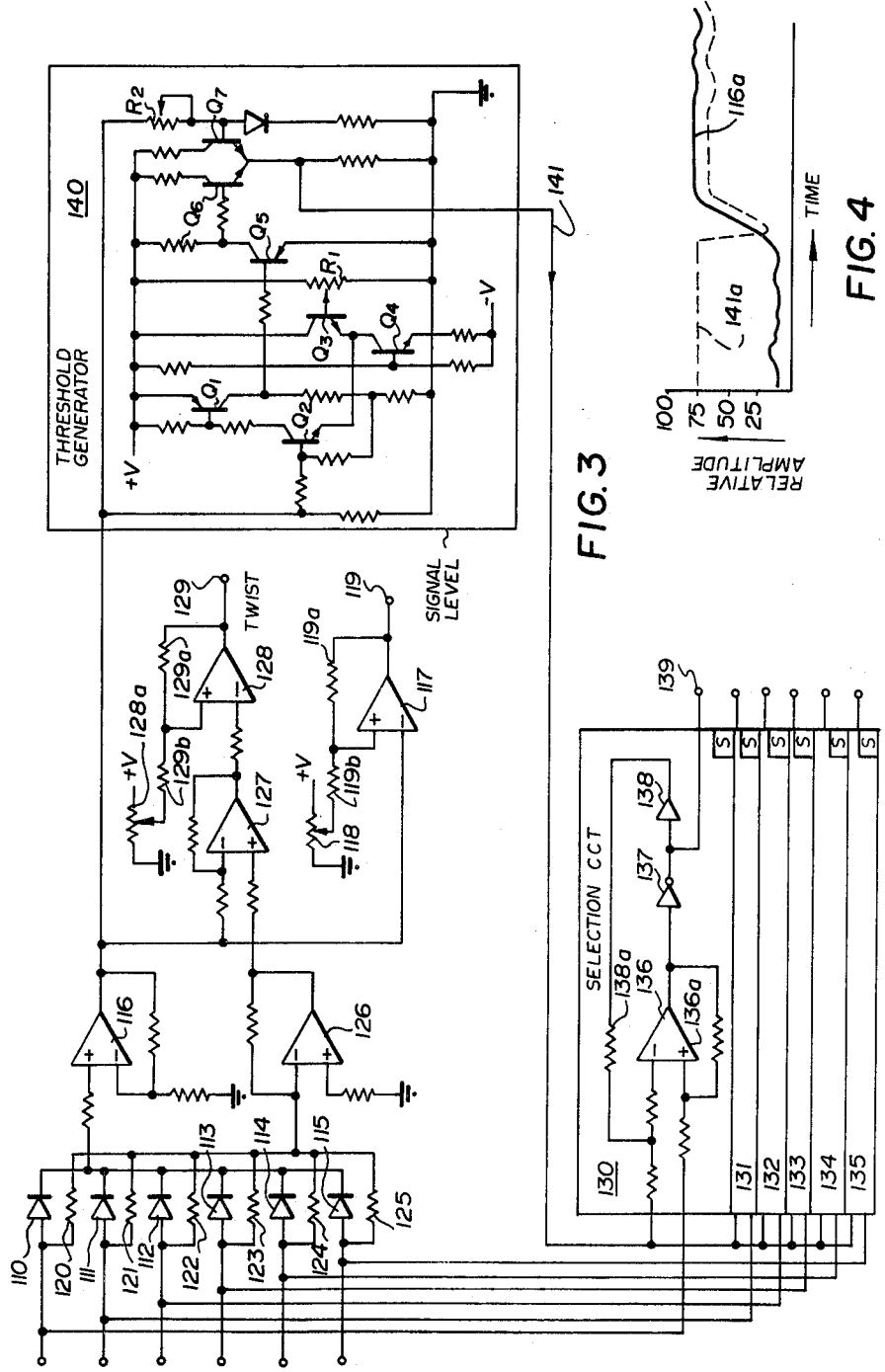

TELEPHONE TONE SIGNALLING RECEIVER WITH UP-CONVERSION OF FREQUENCY OF TONES CONTROLLED BY WORD INSTRUCTIONS

The present invention relates to telephone systems generally and more particularly to a method and apparatus for receiving analogue tone signalling.

The economical manufacture of telephone switching equipment is often decided by the extent of the world marketplace in which the manufacturer can sell the equipment. The future development of new and potentially better telephone switching facilities is considered in the light of the available market potential. One of the major factors in determining the extent, and hence the potential of the market is the compatibility of the manufacturer's switching equipment as it relates to the telephone network standards in various countries. Clearly, before the switching equipment can even be considered by a potential customer, it must be compatible with the customer's present telephone network.

One of the requirements of the typical telephone switching facility is that it be able to receive supervisory information from other switching facilities and also send supervisory information to other switching facilities. This is often typically accomplished by means of tone signalling. Different telephone systems have different tone signalling standards as to the frequency, amplitude, duration and combination of tone signals and in certain circumstances as to whether or not signalling is required. For example, in the North American trunking networks, the multiple frequency (MF) signalling system is used almost universally. In the MF signalling system a destination or intermediate office sends a "proceed-to-send" or "wink" signal to the originating office which in turn sends all the supervisory information via tone signals. In Europe, a compelled multiple frequency (CMF) signalling system is typically used. An originating office in this system sends one digit of supervisory information via tone signals, until the terminating office indicates via another tone signal that the required supervisory digit has been received and so on for each digit until all the required supervisory information has been transmitted and received. Equipment in the particular telephone system must be compatible with the signalling system or systems in order to receive and send signalling.

Major compatibility problems exist in adapting switching equipment of one design to telephone networks having different signalling schemes or formats. Typically, a new receiver compatible with the switching facility and with the customer's telephone network signalling scheme must be designed and developed each time a manufacturer is to enter a marketplace having a different signalling system. This carries two basic disadvantages; one being that the manufacturer must absorb the cost of the new design and development which places him at economic disadvantage particularly in relation to a domestic manufacturer; and the second being that the manufacturer consequently may not be able to deliver as promptly as would the domestic manufacturer.

In the United States patent application Ser. No. 717,618 by E. A. Munter and myself filed on Aug. 25, 1976, now U.S. Pat. No. 4,076,965, we disclosed a "Universal Receiver/Sender," the receiving portion of which included a plurality of commutating filters. Each of these commutating filters depends upon an input clock frequency to define its centre pass frequency. However, compared to some other filters these filters do not have a highly pronounced passband and stopband. Hence the signal fed to each of the commutating filters was prefiltered via at least one preceding active filter which was selected from a group of filters. This arrangement provided a degree of flexibility in a receiver/sender heretofore unknown. However, due to the qualities of the commutating filter, the performance of the receiver was merely adequate and without a significant margin of reserve which operating companies prefer to have in their equipment. Furthermore the disclosed universal receiver/sender is relatively expensive.

The present invention provides a tone signalling receiver having improved performance and simplified circuitry while maintaining the flexibility of a receiver having commutating filters.

In accordance with the present invention a tone signal receiver for detecting audio frequency tone signalling comprises a modulator and a filter connected in series, the filter having predetermined passband characteristics. The modulator receives a first signal having a preselected frequency and a tone signal. In the modulator the first signal is modulated by the tone signal to produce a new signal having a frequency component removed from the preselected frequency by an amount corresponding to the frequency of the tone signal. If the received tone signal is of a predetermined frequency, an alternating current signal appears at the output of the filter.

In one embodiment, the filter includes a piezoelectric element resulting in a sharply defined passband characteristic. Also, the first signal is provided in the form of a square wave signal to a balanced modulator to generate a modulated signal in which the preselected frequency is substantially suppressed at the output of the modulator. The combined effect of these features provide a highly sensitive and selective tone receiver.

In accordance with the present invention there is also provided a method for detecting audio frequency tone signalling. The method comprises the steps of up-converting a received audio frequency tone signal and filtering the up-converted signal in a filter having a predetermined and fixed passband characteristic. The detection of a signal at the output of the filter indicates the presence of a tone signal of a predetermined frequency.

Also in accordance with the present invention, a method for determining whether or not the operating characteristics of a tone signalling sender are within prescribed first and second limits is provided. The method is operable in a system having a tone receiver apparatus for receiving tone signals, the tone receiver having a passband of at least twice the width of first and second operating frequency limits of the sender. The tone receiver apparatus is responsive to a word instruction to define the passband thereof. A tone signal is transmitted from the tone signalling sender to the tone receiver apparatus. The tone receiver apparatus is operated with a first word instruction and then with a second word instruction causing one and the other edges of the passband of the tone receiver apparatus to correspond with the first and second limits respectively. The receipt of the tone signal during operation of the tone receiver apparatus with both said first and second word instructions indicates that the tone signalling sender is in satisfactory operating condition.

An example embodiment of the invention will now be described with reference to the accompanying drawings in which:

FIG. 3 is a schematic and block diagram of an interface circuit for selecting from the outputs of the receiver in FIG. 1 those outputs indicating the receipt of tone signals; and FIG. 4 is a graphical representation of one of the functions of the circuit in FIG. 3.

Figures 1, 2:
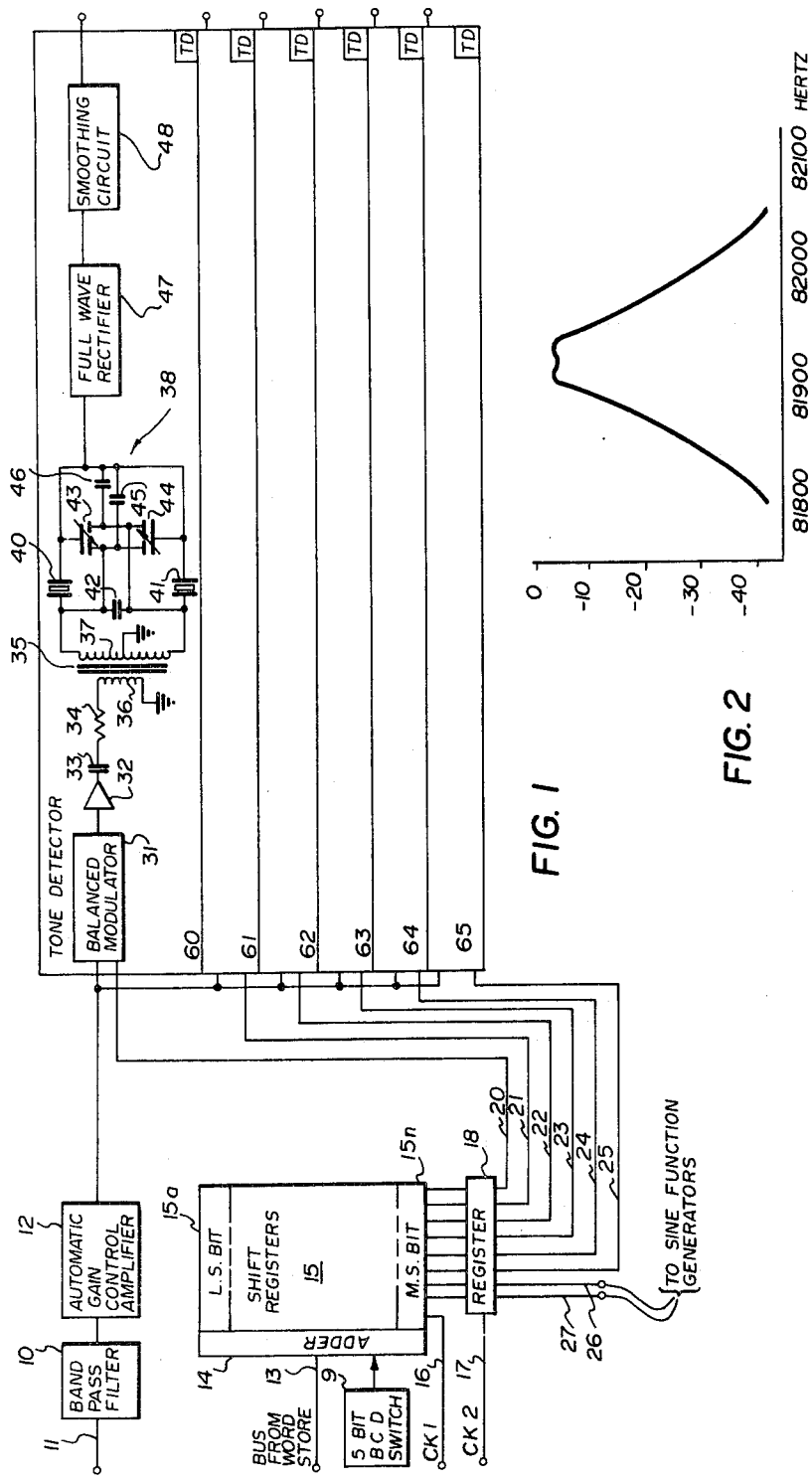
FIG. 1 is a schematic block diagram of a receiver circuit in accordance with the invention.
FIG. 2 is a graphical illustration of typical passband characteristics of a filter illustrated in FIG. 1.

The receiver circuit in FIG. 1 may be substituted for the receiver portion of the receiver/sender apparatus disclosed in the previously mentioned patent by E. A. Munter et al. A bandpass filter 10 includes an input port 11 for connection via a telephone switching facility to a signalling path in a telephone network. The output of the passband filter 10 is connected to an automatic gain control amplifier 12. Tone detector circuits 60–65 are each adapted to receive a different tone signal and each circuit includes an audio signal input connected to the output of the automatic gain control amplifier 12. A programmable clock includes an adder 14 having an input port 13 for receiving instruction words from a word store or the like. The adder 14 is connected to shift registers 15 which include a least significant bit shift register 15a and a most significant bit shift register 15n. Each of the shift registers is connected to a clock port 16 for receiving clock pulses CK1. An output register 18 includes inputs for receiving eight clock signals from the shift register 15n, a clock input port 17 for receiving clock pulses CK2 and reference frequency outputs 20–27. Outputs 26 and 27 are intended for connection to sine function generators in the associated sender and are merely shown to indicate that a variety of timing or reference functions are typically generated by the programmable clock in a receiver/sender apparatus. The reference frequency outputs 20–25 are connected to a respective one of the tone detector circuits 60–65.

Each of the tone detector circuits 60–65 includes a balanced modulator 31 having an input for receiving audio signals from the automatic gain control amplifier 12 and an input for receiving one of the reference frequencies from the programmable clock. A suitable balanced modulator is an integrated circuit identified as MC1596, the operation of which is described in an application note AN-531 by Roy Hejhall and published by Motorola Semiconductor Products Inc. The output of the balanced modulator 31 is connected to the input of a buffer amplifier 32, the output of which is connected via a capacitor 33 and a resistor 34 to a primary winding 36 in a transformer 35.

The physical description of the receiver up to this point has included tone signal reception and up-converting portions of the receiver. In operation, signalling tones received at the port 11 pass through the filter 10 and are amplified to a predetermined amplitude by the automatic gain control amplifier 12. The programmable clock, elements 14, 15 and 18, operates as described in the aforementioned patent application to produce square wave signals having a fundamental frequency of, for example about 80 KHz. In each balanced modulator 31 the reference frequency from a respective output of the programmable clock is modulated by the audio signals received by the modulator. The resultant signal from the balanced modulator 31 includes frequencies removed from the fundamental frequency by an amount corresponding to the frequencies of the audio signal, however the fundamental frequency is substantially suppressed. The output of the balanced modulator 31 is coupled to a crystal filter circuit 38 via the buffer amplifier 32 and the transformer 35.

The crystal filter circuit 38 includes piezoelectric elements 40 and 41 connected in series across a centre tapped secondary winding 37 in the transformer 35. The junction between the piezoelectric elements 40 and 41 is the output of the filter and is connected to the input of a full wave rectifier 47. Capacitive elements 42–46 are connected as shown in FIG. 1 and in combination with the piezoelectric elements 40 and 41 provide a crystal filter circuit which is adjustable to a minor extent via variable capacitive elements 43 and 44. An example of component values suitable for construction of the crystal filter are given in the table below:

| Filter Component | Value |
| --- | --- |
| 40 crystal 81.892 KHz | 37.24 H |
| 41 crystal 81.926 KHz | 35.62 H |
| 42 capacitor | 530 pf |
| 43–44 differential trimmer capacitor | 1.4 pf–6.7 pf |
| 45 capacitor | 182 pf |
| 46 capacitor | 191 pf |

An example of a typical bandpass characteristic of the crystal filter is illustrated by the curve on the graph in FIG. 2. The horizontal and vertical axis of the graph are scaled in frequency and decibels respectively. Between -1 and -2 decibels from the peak of the curve the passband is between 40 and 50 Hz wide and at about -30 decibels from the peak of the curve the passband is between 160 and 180 Hz wide. This precisely defined passband width is ideally suited to the reception of tone signalling. The full wave rectifier 47 is followed by smoothing circuit 48, the output of which comprises the output of the tone detector.

In operation, a predetermined tone frequency signal up-converted in the modulators 31 is passed through one of the crystal filters and detected in the full wave rectifier 47. The detected signal is smoothed in the smoothing circuit 48. The smoothing circuit 48 can be for example a low pass filter circuit or an active integrator circuit. The response time of the tone detector is in the order of a few cycles duration of the frequency of the tone signal from the time the tone signal is initially received. This is because the up-converted signal is of a very high frequency relative the original tone signal frequency. The response time of the tone detector is therefore rapid in comparison to typical analogue high Q tone filters operating at audio frequencies.

The outputs of the tone detector circuits 60–65, in FIG. 1 are connected to respective ones of diodes 110–115, resistors 120–125, and selection circuits 130–135. The cathodes of the diodes 110–115 are connected together and to a voltage following amplifier 116. The highest level signal from among the tone detector circuits 60–65 is passed by one of the respective diodes 110–115 and applied to the non-inverting input of the amplifier 116. The threshold level and gain of the amplifier 116 are determined by its associated resistor network, in a well known manner. The output of the amplifier 116 is connected to a threshold generator 140 and also to the inverting input of a comparator 117. The output of the comparator 117 is connected to a signal level terminal 119. The non-inverting input of the comparator 117 is connected to the terminal 119 via a resistor 119a and to the wiper arm of a potentiometer 118 via a resistor 119b. The potentiometer 118 is connected between a positive voltage +V and ground. A reference potential is established at the arm of the potentiometer 118 which in combination with positive feedback conducted via the resistor 119a, from the signal level terminal 119, establishes a threshold at the non-inverting input of the comparator 117. In the event that the signal at the signal level terminal 119 is of a low potential it is an indication that sufficient signal is being detected by at least one of the detector circuits 60–65 to be representative of valid signalling.

The sum of all the signals from the tone detector circuits 60–65 is derived at the junction between the resistors 120–125. This junction is connected to the inverting input of an amplifier 126. This sum is amplified with an amount of gain as determined by the resistive network associated with the amplifier 126 to generate a sum signal. The sum signal is applied to the non-inverting input of a differential amplifier 127. The signal from the output of the amplifier 116 is applied to the inverting input of the differential amplifier 127. When the output of the amplifier 116 is substantially more positive than the sum signal at the output of the amplifier 126 the otput of the differential amplifier 127 tends toward a negative potential. A comparator 128 includes an inverting input connected to the output of the differential amplifier 127 and an output connected to a twist terminal 129. The non-inverting input of the comparator 128 is connected to the terminal 129 via a resistor 129a and to the wiper arm of a potentiometer 128a via a resistor 129b. A reference potential is established at the arm of the potentiometer 128a which in combination with positive feedback conducted via the resistor 129a from the twist terminal 129 establishes a threshold at the non-inverting input of the amplifier 128. When the signal level from the differential amplifier 127 tends to be sufficiently more negative than the potential at the arm of the potentiometer 128a, the output of the amplifier 128 becomes more positive. This indicates, at the twist terminal 129, an out of limits imbalance or twist between the signals detected by the tone detectors 60–65. When the outputs of the amplifier 116 and the amplifier 126 correspond more closely, the output of the amplifier 128 tends toward negative indicating an acceptable balance or twist. The threshold of the twist indication can be varied by manual adjustment of the potentiometer 128a. It should be noted that both the comparators 117 and 128 have positive feedback loops associated with them, which include the resistors 119a and 129a respectively. These positive feedback loops provide threshold voltage hysteresis to prevent the output of each comparator from changing in response to insignificant interruptions or variances in the tone signals being received.

Each of the selection circuits 130–135 include a comparator 136 with a positive feedback loop connected between the non-inverting input and the output of the comparator 136 via a resistor 136a. A threshold signal from the threshold generator 140 is connected along with another positive feedback loop to the inverting input of the comparator 136. The other feedback loop includes an amplifier 138 and a resistor 138a. An inverting amplifier 137 includes an input connected to the output of the comparator 136 and an output connected to an output terminal 139 and the input of the amplifier 138. In the presence of a substantial signal from one of the tone detectors the associated selection circuit generates a low signal at its output to indicate the receipt of a tone signal. On the other hand a higher potential at its output indicates that insufficient signal is being received from the associated tone detector.

Referring now to the threshold generator 140 in FIG. 3, the structure of the threshold generator circuit will become apparent in the following functional description in which only the active components of the circuit are identified. In a quiescent state the input at the base electrode of a transistor $Q_2$ is relatively low causing transistors $Q_2$, $Q_1$ and $Q_5$ to be OFF. Transistors $Q_6$ and $Q_7$ each have their collector electrodes connected via resistors with the positive supply +V and their emitter electrodes connected in common with the output 141 of the threshold generator 140. As the transistor $Q_5$ is OFF the transistor $Q_6$ is ON, and causes the potential at the output 141 to approach the potential of the positive supply +V. When a signal is amplified by the amplifier 116, the input to the threshold generator 140 becomes more positive. This causes the transistors $Q_2$, $Q_1$ and $Q_5$ to be ON and the transistor $Q_6$ to be OFF. Consequently the transistor $Q_7$ is ON. In this case the potential on the output 141 follows the potential at the output of the amplifier 116, however scaled by a variable resistor R2.

The potential at the collector electrode of the transistor $Q_1$ is fed back in a positive manner to the base electrode of the transistor $Q_2$. This positive feedback provides the threshold generator with an input hysteresis characteristic so that its function is not unduly disturbed by minor variations in the signal level from the amplifier 116. The signal level at which the transistor $Q_2$ switches ON is sharply controlled by a constant current functional chain including transistors $Q_3 Q_4$. The potential of the emitter electrode of the transistor $Q_2$ is determined via the transistor $Q_3$ and the setting of a potentiometer $R_1$.

A typical variance of the signal from the threshold generator is shown graphically in FIG. 4. The vertical axis is graduated in relative amplitude and the horizontal axis represents time. The amplitude of the signal from the amplifier 116 is represented by a solid line 116a and the output from the threshold generator circuit 140 is represented by a broken line 141a. It will be noted from observing FIG. 4 that the moment there is a sharp rise in the level of the signal from the amplifier 116 indicating that a tone signal is being initially received, there is an abrupt drop in the signal from the threshold generator circuit 140. This encourages the associated ones of the selection circuits 130–135 to respond to the outputs of the associated tone detector circuits 60–65. Thereafter the threshold signal substantially follows the level of the signal from the amplifier 116 to substantially prevent a delayed incorrect response by another of the selection circuits 130–135. Typically two selection circuits will respond as typically two tones with less than about 7 decibels of amplitude difference or twist are simultaneously received during multi-frequency signalling.

In operation in a telephone system, the receiver apparatus in the example embodiment uses a clock signal CK1 having a frequency of about 5.242880 MHz with the clock CK2 derived by dividing the clock signal CK1 by eight. Under these circumstances the programmable clock will operate to produce square wave signals at a fundamental frequency of 81,920 Hz while receiving a binary instruction word of the value two taken to the thirteenth power ($2^{13}$). The crystal filters are each constructed to have a centre frequency of 81,920 Hz and the programmable clock typically receives the least significant 8 bits of the word instruction from an alterable source in order to offset the outputs of the programmable generator by the amounts of the frequencies intended for detection.

The tone receiver apparatus is adaptable for use in a maintenance procedure to check the performance of a tone signalling sender. In the maintenance procedure the programmable clock is caused to deviate from the prescribed fundamental frequency by a small predetermined amount. This deviation causes a similar deviation in the frequency of the reference signal from the register 18 and in essence alters the effective pass band in the associated tone receiver. The amount of deviation used can be up to as much but not more than about one half the width of the pass band characteristic of each of the filters in the tone detector 60–65. To check the performance of a selected tone signalling sender, the selected sender is activated to transmit a predetermined tone typically through the associated switching facility, to the tone receiver apparatus. The tone receiver is operated with deviations from the intended frequency corresponding to first and second predetermined allowable limits in the performance of the sender. A sender circuit which is in proper working order will continue to be detected by the tone receiver apparatus while its centre filtering frequency is varied between the first and second predetermined limits. On the other hand a sender, out of operational frequency specification will not be detected during tone receiver operation at one of the first and second limits. In order to implement this maintenance procedure word instruction sets are supplied to perform this function as required. This function can also be performed manually. For example, in FIG. 1 a 5 bit binary switch 9 is connected with the adder 14 so that the resulting reference frequencies are manually alterable to first and second limits.

Although the example embodiment is directed toward implementing a flexible tone receiver for multifrequency (MF) or compelled multifrequency (CMF) telephone signalling, it is quite conveniently adaptable to receiving dialling tone signals from a subscriber apparatus for example as in a DIGITONE* or TOUCH-TONE* system. In an alternate embodiment solely one reference frequency may be used with the pass band of each of the filters, in an appropriate number of tone detectors arranged to be mutually exclusive. In this case, as there is only one reference frequency source, there need be only one modulator with each of the filters being fed directly from it.

*Trademark

What is claimed is:

1. A tone receiver apparatus for use in combination with a telephone switching facility in a telephone network in which supervisory signalling is carried by audio frequency signals of predetermined frequencies, the tone receiver apparatus comprising:
   means responsive to a plurality of word instructions from the telephone switching facility for generating a corresponding plurality of reference signals, each one having a respective fundamental frequency, greater than an audible frequency;
   a plurality of modulator circuits each having a first input for receiving tone signals from the telephone network and a second input connected to the generating means for receiving a respective one of the reference signals, each modulator being responsive to the signals appearing at said first and second inputs for producing at its output an alternating current signal having a frequency removed from the frequency of the respective reference signal by the amount of the frequency of the tone signal received from the telephone network;
   a plurality of rectifier circuits for generating a direct current in response to an alternating current, each of the rectifier circuits being associated with a respective one of the modulator circuits;
   a plurality of filter circuits each having a predetermined pass band characteristic, each filter circuit being connected in series between one of the modulator circuits and its associated rectifier circuit, each filter circuit being adapted to pass signals within its pass band characteristic to the associated rectifier circuit, whereby a plurality of detectable tones is determined by the word instruction.

2. A tone receiver apparatus as defined in claim 1 in which the pass band and centre frequency characteristics of each of the filter circuits substantially correspond one with the other whereby the frequency of each detectable tone is substantially determined solely by the reference signal received by each modulator circuit.

3. A tone receiver apparatus as defined in claim 2 wherein each modulator circuit is a balanced modulator circuit, and the means for generating the reference signals includes means for generating each reference signal in the form of a substantially square wave signal.

4. A tone receiver apparatus as defined in claim 2 wherein each filter circuit includes a crystal element, said crystal element substantially determining the centre frequency of its associated filter circuit.

5. A tone receiver apparatus as defined in claim 3, wherein each filter circuit includes a crystal element, said crystal element substantially determining the centre frequency of each of its associated filter circuits.

6. A method for detecting tone signalling, from a telephone network having switching facilities in a receiver which includes a plurality of filter circuits each having ultrasonic pass band characteristics determined by a piezoelectric element, the method comprising the steps of:
   (a) generating reference frequency signals each having a fundamental frequency within a frequency spectrum corresponding to a typical frequency spectrum of resonant operation of said piezoelectric elements, the fundamental frequency of each reference signal being defined by one of a predetermined set of word instructions from one of the switching facilities;
   (b) up-converting audio signals from the telephone network with said plurality of reference frequency signals;
   (c) filtering the up-converted signals associated with each of reference frequency signals in each of the filter circuits;
   (d) detecting the output of each of the filter circuits; whereby the presence of a tone signal having a predetermined frequency associated with one of said word instructions is indicated.

* * * * *